No. 759,808.

Patented May 10, 1904.

UNITED STATES PATENT OFFICE.

LOUIS A. DREYFUS, OF NEW BRIGHTON, NEW YORK.

TREATMENT OF CASEIN.

SPECIFICATION forming part of Letters Patent No. 759,808, dated May 10, 1904.

Application filed September 24, 1903. Serial No. 174,443. (No specimens.)

*To all whom it may concern:*

Be it known that I, LOUIS A. DREYFUS, a citizen of the United States, and a resident of New Brighton, in the county of Richmond and State of New York, have invented certain new and useful Improvements in the Treatment of Casein, of which the following is a specification.

My invention relates to the treatment of casein, the object being mainly to improve its insoluble properties when used as one of the component parts of paint or for other purposes.

In the use of ordinary casein as one of the component parts of paint it has been found to have two reactions—that is to say, when mixed with lime or other solvents, as in making paint, a compound is formed which is soluble in water. The second reaction is that in time the compound becomes insoluble in water; but with the common casein paint, commonly known as "cold-water" paint, a considerable time is required for the second reaction to become fixed. With my treatment the second reaction begins almost immediately and is practically complete within about twenty-four hours, so that while with ordinary casein-paint wetting of the painted surface, as by rain or snow, will cause the paint to wash off with my method the insoluble condition is practically complete within a comparatively short time and wetting of the painted surface will have no material effect.

In carrying out my process I take dry casein, which contains sulfuric or other acids, either added to the product or left therein in the process of making it from the milk, and subject it to the action of heat and continue the heating for a protracted period of time, varying with the temperature employed. I have found that a temperature slightly below the boiling-point of water continued for about twenty-four hours will dehydrate or change the properties of the casein so that while its soluble qualities when mixed with lime or other solvent and water will remain about the same, yet after such mixture the secondary reaction will immediately begin, and within about twenty-four hours after application the paint will be practically insoluble and weatherproof.

While the temperature and the period of time of heating mentioned—to wit, say about 200° Fahrenheit above zero continued for about twenty-four hours—are preferred, I have found that a temperature of 120° Fahrenheit above zero continued for one hundred hours will produce a desirable result, and therefore I do not wish to be understood as limiting myself to any special temperature or to any special period.

Another step in my process consists in mingling talc, whiting, or other pulverized base with the dry acidulated casein and subjecting the whole to heat, as before. The main advantage of this is that the talc, whiting, or other neutral base serves to insulate or protect to a degree the casein from the dangers of excessive heat and from being scorched, and in this way a higher temperature may be safely employed, thus reducing the period of continuing the treatment.

Having thus described my invention, what I claim as new, and desire to secure by Letters Patent, is—

1. The process herein described of improving the insoluble properties of casein which consists in subjecting it while in a dry state to the action of heat in the presence of acid, substantially as set forth.

2. The process herein described of improving the insoluble properties of casein which consists in subjecting it while in a dry state to the action of heat in the presence of sulfuric acid, substantially as set forth.

3. The process herein described of improving the insoluble properties of casein which consists in heating acidulated casein mixed with a mineral base substantially as set forth.

4. The process herein described of improving the insoluble properties of casein which consists in subjecting dry acidulated casein to the action of heat for a period of twenty-four hours more or less, substantially as set forth.

LOUIS A. DREYFUS.

Witnesses:
   H. A. WEST,
   JACOB MAKAY.